Dec. 7, 1971  G. S. SCHAIRER ET AL  3,625,009
MULTI-TUBE NOISE SUPPRESSOR PROVIDING THRUST AUGMENTATION
Filed June 5, 1970                                      5 Sheets-Sheet 1

INVENTORS,
GEORGE S. SCHAIRER
ROSS W. COLEBROOK
BY
Kenneth M. MacIntosh
ATTORNEY

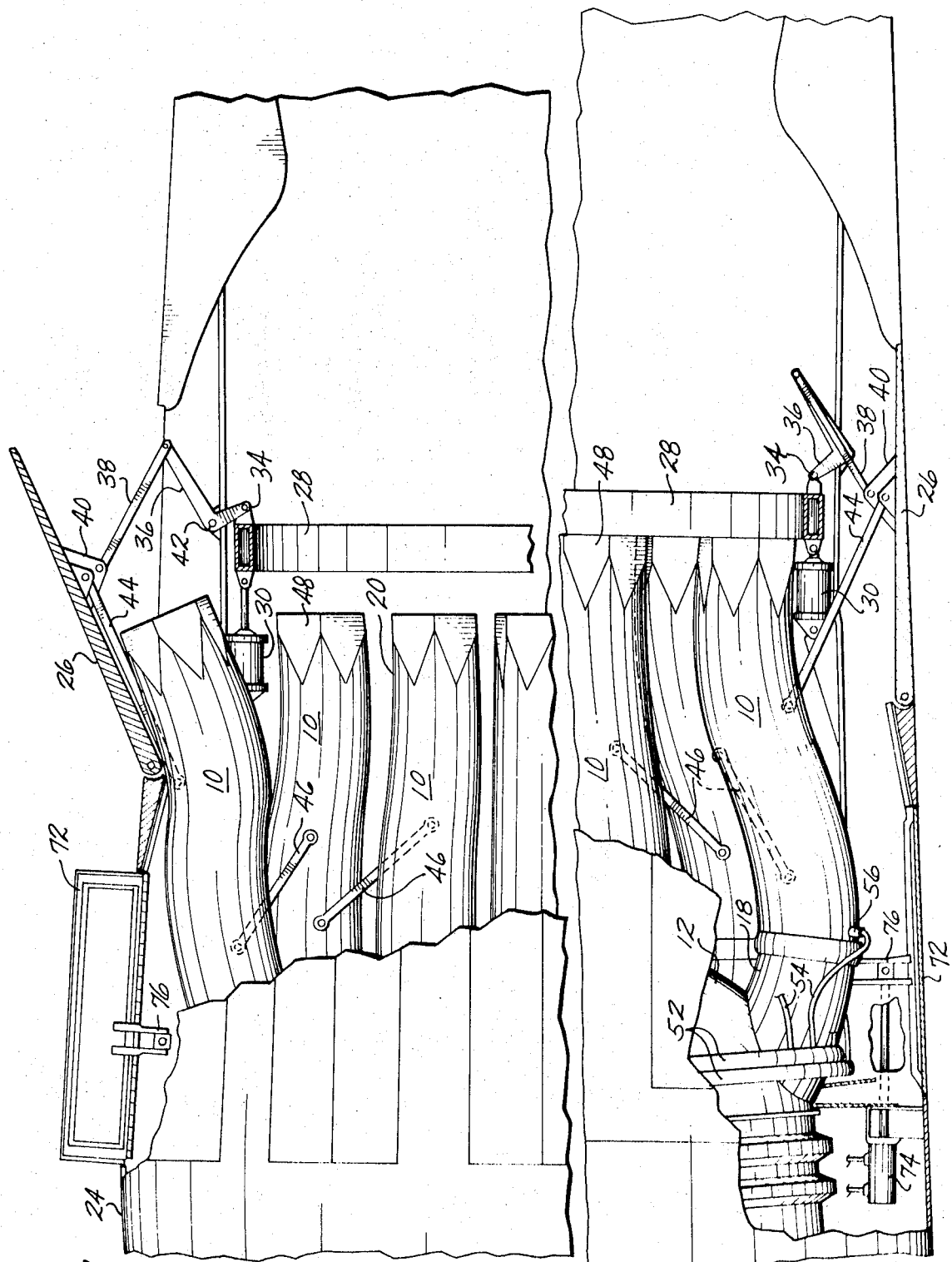

INVENTORS,
GEORGE S. SCHAIRER
ROSS W. COLEBROOK
BY

ATTORNEY

INVENTORS,
GEORGE S. SCHAIRER
ROSS W. COLEBROOK
BY

ATTORNEY

United States Patent Office 3,625,009
Patented Dec. 7, 1971

3,625,009
MULTI-TUBE NOISE SUPPRESSOR PROVIDING THRUST AUGMENTATION
George S. Schairer and Ross W. Colebrook, Bellevue, Wash., assignors to The Boeing Company, Seattle, Wash.
Filed June 5, 1970, Ser. No. 43,888
Int. Cl. F02k 1/26, 3/08
U.S. Cl. 60—261                    16 Claims

ABSTRACT OF THE DISCLOSURE

A noise suppressor having a plurality of exhaust tubes, for receiving jet engine exhaust gases, movable between a first close packed position, wherein the tubes discharge exhaust gases in a single composite jet within a surrounding tubular nacelle, where one is employed; and a second radially deployed position, wherein the exhaust gases are discharged as separated jets with the outer peripheral tubes discharging separate jets through openable apertures in the nacelle wall; and having fuel nozzles and flame holders positioned interiorly of the exhaust tubes for selectively introducing and burning fuel within the tubes for thrust augmentation. Cooling liners are provided inside the exhaust tubes to cool the wall surfaces and tertiary air doors are provided in the nacelle upstream of the tubes to supply ambient air for mixing with the exhaust gases when the tubes are in the deployed position.

BACKGROUND OF THE INVENTION

Designs for advanced aircraft such as supersonic commercial transports specify the use of thrust augmentation during considerable portions of the flight regime. Thrust augmentation in jet aircraft is normally provided by introducing a quantity of fuel into the turbine discharge gases and burning the fuel in the exhaust duct, thus increasing the energy level of the exhaust gases to provide increased thrust from the power plant. Because these aircraft are also designed to operate near population centers, means must be provided for suppressing exhaust noise. Extensive studies have shown that significant exhaust noise suppression is obtained by exhausting the turbine discharge gases through a plurality of relatively small diameter tubes, an apparatus normally referred to as a multi-tube noise suppressor. The plurality of exhaust tubes creates increased turbulence and a mixing of the exhaust gases with the ambient air in a manner well-known in the art.

The incorporation of both thrust augmentation or afterburning apparatus and a multi-tube noise suppressor poses considerable problems for the aircraft designer. Because of the high velocity and relatively low pressure of the exhaust gases issuing from the multitube noise suppressor, thrust augmentation cannot be practically applied downstream of the suppressor. In addition, thrust augmentation placed in that position would to a considerable extent nullify any noise suppression obtained by the suppressor. While it is possible to position the thrust augmentation apparatus upstream of the noise suppressor tubes, several problems are introduced by such a design. At full thrust augmentation, portions of the exhaust gas reach temperatures of approximately 3500° R. to which would be exposed the plurality of noise suppressor tubes. This poses a serious cooling problem, particularly with respect to the inner tubes grouped about the longitudinal axes of the noise suppressor. In order to provide any reasonable amount of longevity to such a noise suppressor design, cooling air would have to be drawn from the engine compressor and introduced around and between the various noise suppressor tubes. The drawing of this cooling air would impose a severe penalty on the engine-airplane performance. In addition to cooling requirements and pressure losses, placing the thrust augmenter upstream of the multi-tube noise suppressor would require an elaborate control system to accurately distribute the fuel in the individual regions of the exhaust gas flow as the nozzle area is changed. Otherwise, various tubes, depending upon their proximity to the nozzle, may or may not choke during partial augmentation. It is apparent therefore that there did not heretofore exist a suitable design for obtaining the suppression advantages of a multi-tube noise suppressor with a jet aircraft power plant incorporating thrust augmentation.

SUMMARY OF THE INVENTION

It is therefore an object of this invention to provide means for incorporating both multi-tube exhaust noise suppression and thrust augmentation in a jet aircraft power plant.

It is another object of this invention to provide an improved multi-tube jet exhaust noise suppressor selectively capable of providing maximum noise suppression during certain portions of the aircraft flight regime and maximum thrust augmentation during other portions of the flight regime.

It is yet another object of this invention to provide a compact, versatile, integrated multi-tube noise suppressor and thrust augmenter suitable for incorporation in nacelle enclosed aircraft jet propulsion plants designed for supersonic flight.

These and other objects of this invention are obtained by an exhaust noise suppressor comprising a plurality of exhaust tubes grouped about a longitudinal axis positioned downstream of the aircraft jet engine for the passage of exhaust gases therethrough; all or certain of the tubes being provided with means for injecting additional fuel into the exhaust gas stream and for burning the fuel in the tubes to provide increased thrust. The maximum noise suppression and thrust augmentation capabilities of the exhaust nozzle of this invention can be obtained by providing means for moving the plurality of tubes between a first position, in which the downstream ends of the tubes are close packed so as to discharge the exhaust gases in a substantially single composite jet; and a second position, in which the downstream ends of the exhaust tubes are radially deployed so as to discharge the exhaust gases in a plurality of substantially separate jets. In this manner, maximum thrust augmentation is provided by positioning the exhaust tubes in the close packed position and maximum noise suppression can be obtained by positioning the exhaust tubes in the radially deployed position for maximum mixing of the exhaust gases with the ambient air. The multi-tube noise suppressor of this invention may be used in conjunction with aircraft powerplants that are designed for either horizontal thrust or vertical lift. In addition, the suppressor of this invention may be used on either subsonic or supersonic aircraft engines. When used in supersonic applications, it is normal practice to enclose the jet engine in a nacelle which extends downstream of the exhaust nozzle for the incorporation of secondary nozzles and other structures therein. In these applications, the second position of the exhaust tubes can be accommodated by providing openable apertures in the nacelle wall so that when the exhaust tubes are radially deployed, the outer peripheral tubes will discharge substantially separate exhaust jets through the opened apertures in the surrounding nacelle.

3

Figure 1:
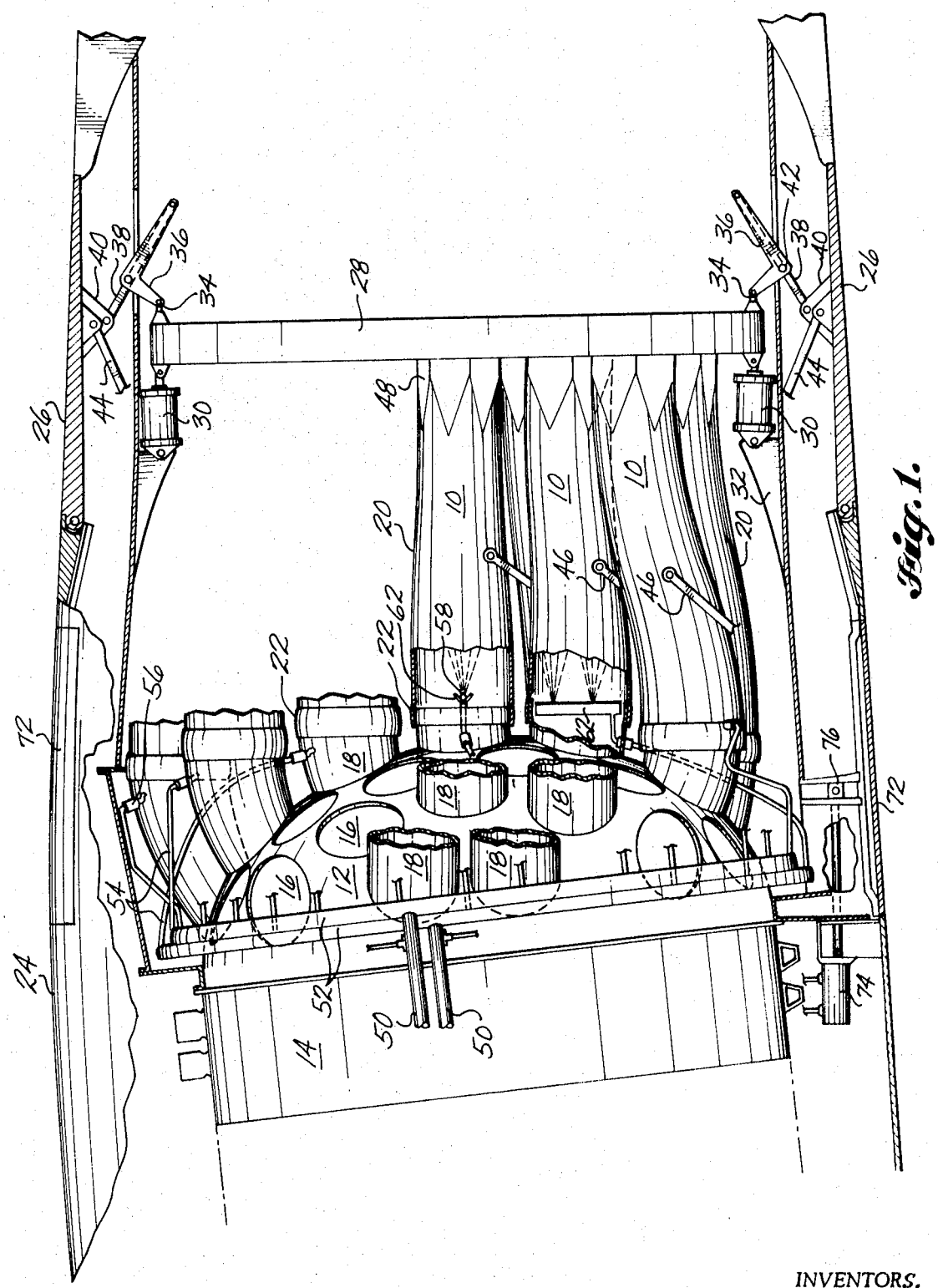
FIG. 1 is a longitudinal sectional view of the noise suppressor of this invention with certain of the exhaust tubes broken away to better illustrate the overall structure.

FIG. 2 is a longitudinal view of the upper portion of the suppressor of FIG. 1 showing the exhaust tubes in the radially deployed position and the nacelle noise suppressor doors open.

FIG. 3 is a longitudinal view of the lower part of the suppressor of FIG. 1 showing the exhaust tubes in their close packed position and the nacelle noise suppressor doors closed.

Figure 4:
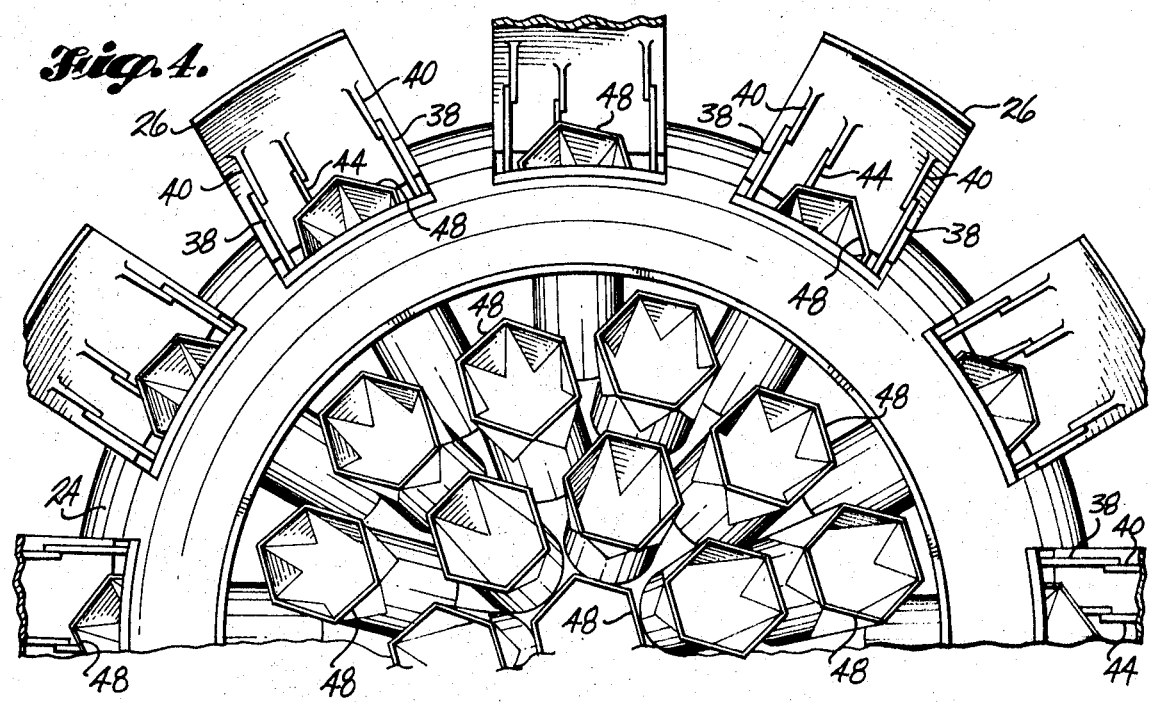

FIG. 4 is a downstream end view of the suppressor of FIG. 2 showing the downstream ends of the exhaust tubes radially deployed and the nacelle noise suppressor doors open.

Figure 5:
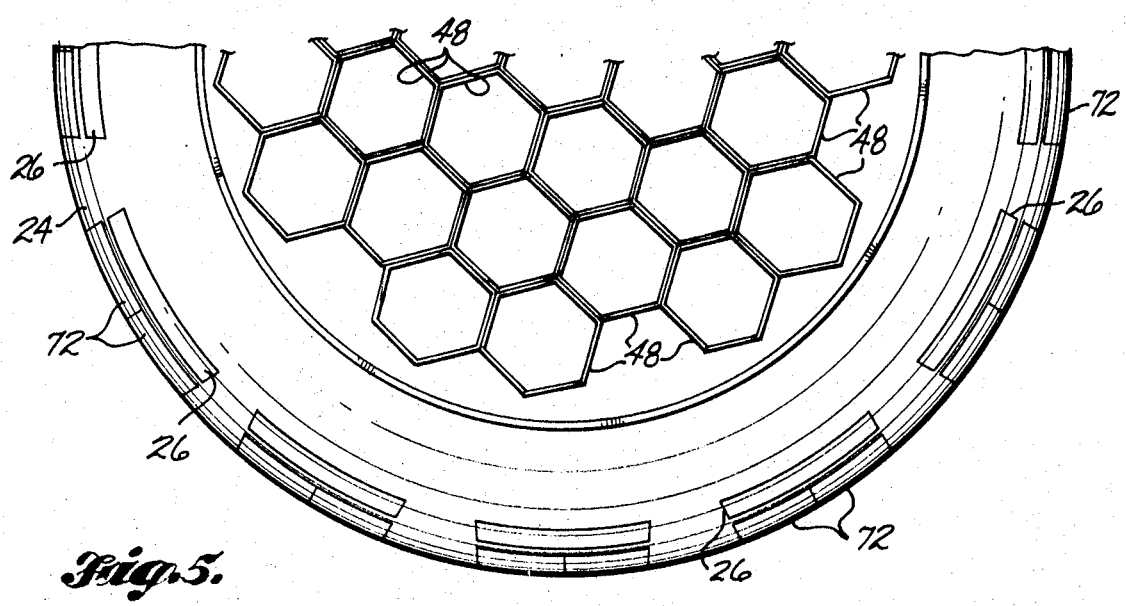

FIG. 5 is the downstream end view of the suppressor of FIG. 3 showing the downstream end of the exhaust tubes close packed and the nacelle noise suppressor doors closed.

Figure 6:
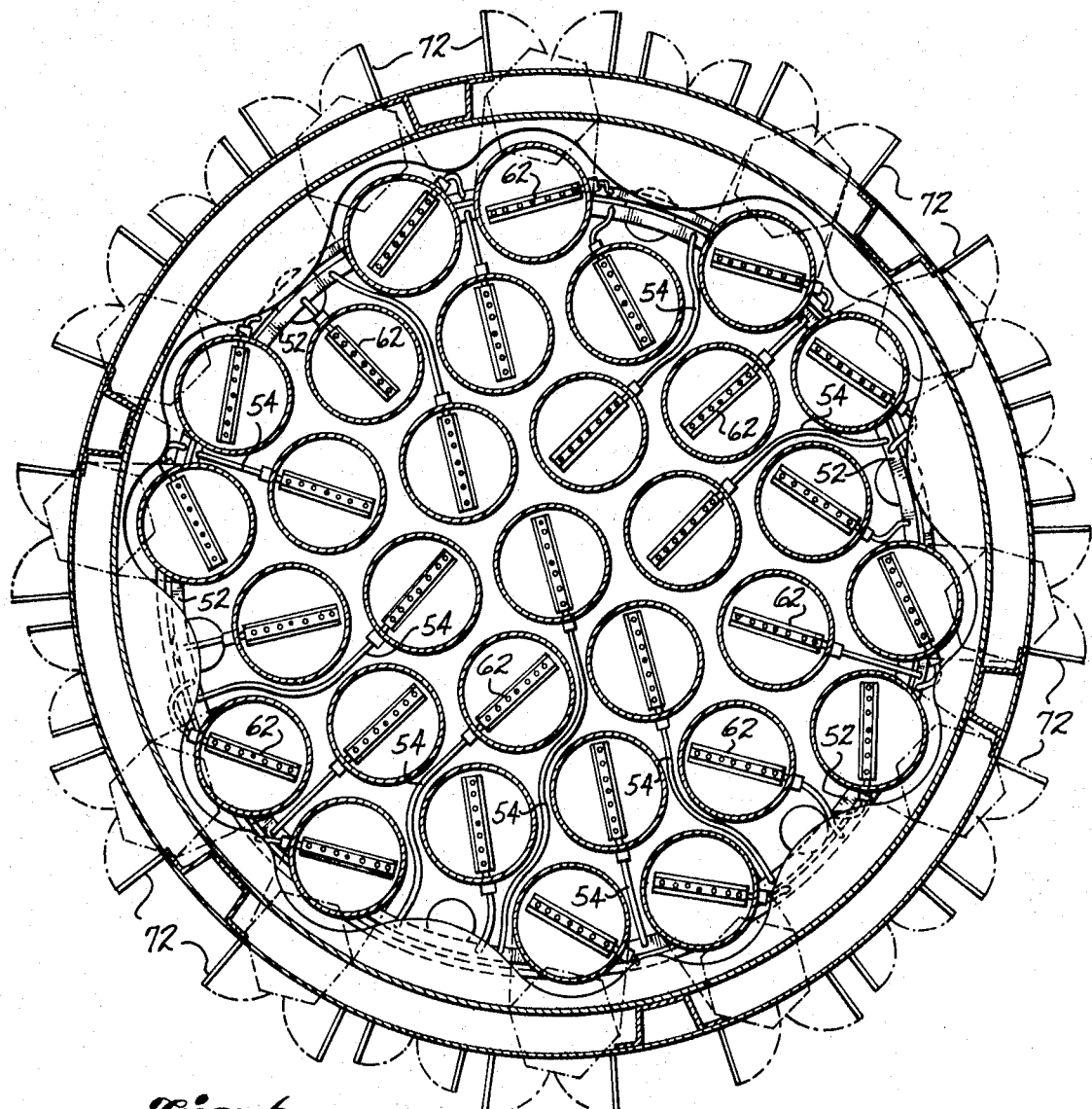

FIG. 6 is a cross-sectional view of the suppressor of FIG. 1 taken near the upstream end of the exhaust tubes showing the details of the thrust augmentation fuel conduits, nozzles, and flame holders.

Figure 7:
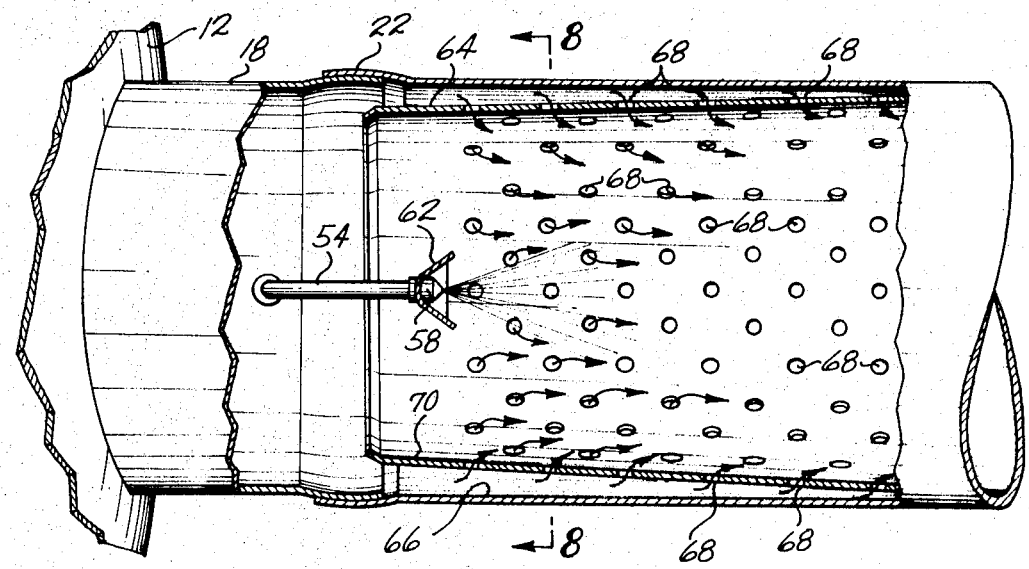

FIG. 7 is a longitudinal sectional view of the single exhaust tube taken near the upstream end showing the details of the thrust augmentation fuel spray nozzles, flame holder, and cooling liner.

Figure 8:
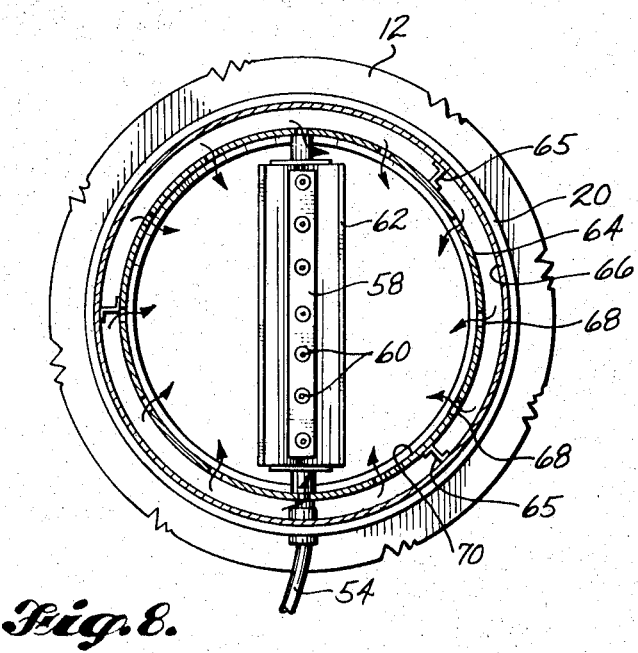

FIG. 8 is a cross-sectional view of the single exhaust tube of FIG. 7 taken along lines 8—8 in that figure and showing further details of the thrust augmentation spray nozzles and flame holder.

DESCRIPTION OF THE PREFERRED EMBODIMENT

The figures show the multi-tube noise suppressor of this invention fitted to a jet engine power plant commonly found on modern jet aircraft. In particular, FIG. 1 shows a plurality of exhaust tubes 10 attached to bulkhead 12 which terminates the downstream end of jet engine 14. Bulkhead 12 has a plurality of apertures 16 formed therein, permitting the passage of exhaust gases from jet engine 14 through exhaust tubes 10. In FIG. 1, certain of exhaust tubes 10 have been broken away or removed in order to more clearly show the structural aspects of the suppressor. Exhaust tubes 10 are comprised of two portions: a first or upstream portion 18 welded or otherwise fixedly attached to bulkhead 12 coincident with apertures 16; and a downstream movable portion 20, movably attached to upstream portion 18 by ball-joint means 22. While the entire jet engine and noise suppressor assembly is shown in FIG. 1 to be enclosed within a tubular nacelle 24 extending downstream of exhaust tubes 10 as is conventional practice in supersonic aircraft, it is to be understood that the features of this invention may be incorporated in power plant installations designed for subsonic aircraft, in which case nacelle 24 would normally terminate at an exit plane near the ends of exhaust tubes 10. In supersonic aircraft applications, other structures such as primary and secondary nozzles and thrust reversers may also be contained within nacelle 24 downstream of exhaust tubes 10 but these structures form no part of the present invention and their details have not been included in the figures for purposes of clarity. Nacelle 24 containing the jet engine power plant 14 and the noise suppressor of this invention may be mounted to the wing of the aircraft or attached to the fuselage in either horizontal or vertical position according to the design of the particular aircraft.

The movable mounting of the downstream portions 20 of exhaust tubes 10 by ball-joint means 22 permits movement of downstream portions 20 between a first close packed position as shown in FIGS. 1 and 3, and a second radially deployed position as shown in FIG. 2. When in the first position, the exhaust gases will issue from the downstream portions 20 in a substantially single composite jet within nacelle 24; and when deployed to the second position the exhaust gases will be discharged from the downstream portions 20 in a plurality of substantially separate jets into the nacelle and through a plurality of noise suppressor doors 26 circumferentially spaced about the nacelle wall. Movement of exhaust tube downstream portions 20 between the first and second position as well as movement of doors 26 between their closed and open positions is provided by actuator ring 28 to which there is connected a hydraulic or other suitable power operable actuating means 30 fastened to a stringer 32 or other suitable structure within nacelle 24. Around the periphery of actuator ring 28 there is provided a plurality of pivotal attachment points 34 connecting actuator ring 28 with a corresponding similar plurality of bellcranks 36. Actuator arms 38 are attached between bellcranks 36 and mounting ears 40 on noise suppressor doors 26. With actuating means 30 in the retracted position, as shown in FIG. 3, actuating ring 28 is in the upstream position and noise suppressor doors 26 are closed. However, when actuating means 30 are energized to the extended position, as shown in FIG. 2, noise suppressor ring 28 translates in a downstream direction, rotating bellcrank assemblies 36 about pivotal axes 42, and by the action of actuating arms 38, move noise suppressor doors 26 to their open position. Each of the noise suppressor doors 26 are connected to one of the downstream portions 20 of the outer peripheral exhaust tubes 10 by connecting links 44 so that when noise suppressor doors 26 are moved to their open position the downstream ends 20 of the outer peripheral exhaust tubes are deployed generally radially outward for the discharge of exhaust gases through the apertures opened by the noise suppressor doors 26. In addition, the downstream portions 20 of the next adjacent radially successive inner exhaust tubes 10 are connected to the outer peripheral tubes by secondary links 46 so that the inner tubes are also deployed radially outward thus resulting in the discharge of exhaust gases in substantially separate jets from the inner tubes within nacelle 24. FIGS. 5 and 4 show the end views of the downstream portions 20 of exhaust tubes 10 in their first or close packed position and in their second or deployed position respectively. By shaping the terminal ends 48 of the downstream portions 20 of the exhaust tubes in a hexagonal configuration, the tube ends when in their first or close packed position will nest adjacent each other thus providing an efficient discharge of jet engine exhaust gas in a substantially single composite jet within nacelle 24.

Thrust augmentation is provided with the noise suppressor apparatus of this invention by introducing additional fuel into the noise suppressor tubes 10 near their upstream ends where the fuel is ignited by the hot exhaust gases passing therethrough. As shown in FIG. 1, fuel supply lines 50 conduct the fuel to manifold rings 52 to which there is attached a plurality of conduits 54 passing, by suitable fittings 56, through the walls of the fixed upstream portions 18 of exhaust tubes 10 and terminating in spray bar nozzles 58 which are positioned along a diameter within the exhaust tubes. As is more clearly shown in FIGS. 7 and 8, spray bar nozzles 58 comprise an extension of conduits 54 arranged transversely within exhaust tubes 10 with a plurality of nozzle apertures 60 facing in a downstream direction to permit the introduction of fuel in a fine spray into the flow of exhaust gases within exhaust tubes 10. Arranged on spray bar nozzles 58 are gutter flame holders 62 which generate turbulence and a region of reduced exhaust gas flow velocity immediately downstream of spray bar nozzles 58 which stabilizes and holds the burning of the introduced fuel primarily within exhaust tubes 10. Also positioned interiorly of exhaust tubes 10 and extending downstream of flame holders 62 are cylindrical liners 64 spaced apart by Z shaped members 65 from interior walls 66 of exhaust tubes 10 so as to form an annular chamber therebetween. While most of the exhaust gases flowing through exhaust tubes 10 also flow through cylindrical liners 64, a certain portion flows through the annular chambers between the cylindrical liners 64 and the interior walls 66 of exhaust tubes 10. These exhaust gases, comprising the cooling gas flow, are of a considerably lower temperature than those exhaust gases flowing through and supporting combustion within cylindrical liners 64 and thus maintain the temperature of the interior wall surfaces 66 of exhaust tubes 10 at a lower level. In addition, a certain portion of the by-pass flow passes through apertures 68 in cylindrical liners 64 and flows along the interior surfaces 70 of the liners thereby cooling those surfaces. Typically, the percentage of by-pass flow through the annular chambers between liners 64 and exhaust tube walls 66 is approximately 5 percent of the total exhaust gas flow through tubes 10.

In operation, exhaust tubes 10 are maintained in their first position with the downstream ends 48 in close packed adjacent relationship so that the exhaust gases are discharged in a substantially single composite jet for efficient thrust generation. While exhaust tubes 10 may be of circular, elliptical or other configuration in cross section, forming their downstream ends 48 into a hexagonal cross sectional configuration insures their placement in a minimum diameter and with substantial continuity of the discharge jet. When thrust augmentation is desired, fuel is introduced via fuel lines 50, manifolds 52, and fuel conduits 54 into all or only certain of the exhaust tubes 10. Multiple fuel lines and manifolds provide increased flexibility for the thrust augmentation apparatus since the additional fuel may be introduced into only selected exhaust tubes. In addition, if there should be a pressure loss in one of the fuel supply lines, thrust augmentation can still be provided in the remainder of the exhaust tubes. Of course, where partial thrust augmentation is not a requirement of the system or where there is insignificant danger of fuel supply failure, a single fuel supply line 50 and manifold ring 52 can be provided. Conversely, where increased flexibility or redundancy for reliability purposes is deemed necessary, an even greater number of fuel lines and ring manifolds may be used.

Because the most efficient thrust generation is obtained when the axes of the discharge gases is parallel to the direction of flight, in certain applications thrust augmentation would normally be used when exhaust tubes 10 are in their close packed position. However, the most efficient noise suppression is obtained with multi-tube noise suppressors when the downstream ends of the individual exhaust tubes are deployed radially outward to a certain extent to promote mixing of the exhaust gases with the ambient air flow. To achieve efficient noise suppression with the noise suppressor of this invention, actuator 30 is energized to open noise suppressor doors 26 and move radially outward the successive rings or layers of exhaust tubes so that the outer peripheral exhaust tubes 10 are deployed to discharge exhaust gases through the apertures opened by noise suppressor doors 26. In this manner, a significant portion of the exhaust gases are discharged as substantially separate jets outside the nacelle 24 and the inner exhaust tube discharge substantially separate exhaust gas jets downstream through the aft portion of the nacelle.

Further mixing of the exhaust gases with the ambient airflow is achieved with the noise suppressor of this invention by opening the plurality of tertiary air doors 72 circumferentially positioned about nacelle 24 upstream of noise suppressor doors 26. Actuator means 74, which may conveniently be an hydraulic motor, is provided along with related ball screw actuating mechanism for moving tertiary air doors 72 between the open and closed positions. In this manner, additional ambient airflow is entrained within nacelle 24 to flow downstream and between the inner peripheral rows of the exhaust tubes 10 thus increasing the mixing of the exhaust gases and the suppression of the exhaust generated noise.

Considerable operational advantages are obtained by the integration of thrust augmentation and noise suppression functions with the apparatus of this invention. For example, while the exhaust gases issuing from jet engine 14 and entering the fixed upstream portions 18 of exhaust tubes 10 may be at a temperature of 2000° R., the temperature of the exhaust gases within the downstream portions 20 of exhaust tubes 10 will reach approximately 3500° R. due to the combustion of the additionally added fuel during thrust augmentation. Thus the relatively cooler exhaust gases issuing from engine 14 may be advantageously used to cool the interior wall surfaces 66 of exhaust tubes 10 in the region of thrust augmentation combustion. This is accomplished by by-passing a portion of the exhaust gas flow around the region of combustion by entraining the exhaust gases through the by-pass chamber formed between cylindrical liner 64 and the interior wall surfaces 66 of exhaust tubes 10. In this manner, the temperature of the exhaust tubes 10 may be maintained at lower operational levels. By contrast, if thrust augmentation were to be provided by a separate burning chamber upstream of the noise suppressor, the temperatures of the exhaust tubes would be unacceptably high and there would be no practical manner of introducing cooling gas flow into and around the cluster of exhaust tubes 10. In addition, the integration of thrust augmentation combustion within the noise suppressor tubes provides a saving in space inasmuch as a separate volume does not have to be provided for a separate thrust augmentation apparatus.

I claim:

1. In combination with a jet engine noise suppressor of the type having a plurality of exhaust tubes for passage of jet engine exhaust gas therethrough, the improvement which comprises thrust augmentation means operatively associated with said exhaust tubes for selectively injecting and burning fuel within said exhaust tubes to provide thrust augmentation.

2. The combination as claimed in claim 1 wherein said thrust augmentation means comprises:
   (a) conduit means terminating in a nozzle end within at least certain of said exhaust tubes and adapted to introduce fuel into the exhaust gas stream; and
   (b) flame holder means positioned in the exhaust gas stream within said certain exhaust tubes for generating a region of reduced exhaust gas flow velocity downstream of the nozzle end of said conduit means for stabilizing combustion of the introduced fuel.

3. The combination as claimed in claim 2 further including exhaust tube cooling means positioned interiorly of said exhaust tubes extending downstream of said flame holder means for diverting a portion of the exhaust gas flow around the region of reduced exhaust gas flow velocity to cool the interior wall surface of said exhaust tubes.

4. The combination as claimed in claim 3 wherein said exhaust tube cooling means comprises a perforated cylindrical sleeve coaxially positioned within said exhaust tubes and spaced apart from the interior wall surface thereof forming an annular chamber between said sleeve and the interior wall surface of said exhaust tubes for the flow of said portion of the exhaust gas therethrough.

5. An apparatus for jet engine exhaust noise suppression and thrust augmentation comprising:
   (a) a plurality of exhaust tubes, grouped about a central longitudinal axis, having upstream ends for receiving the jet engine exhaust gas and downstream ends for the discharge of said gas; said exhaust tubes being movable between a first position, wherein the downstream ends of said exhaust tubes are close packed in adjacent relationship for discharge of the jet engine exhaust gas in a substantially single composite jet, and a second position wherein the downstream ends of said exhaust tubes are deployed in a radially spaced apart relationship for discharge of the jet engine exhaust gases in a corresponding plurality of substantially separate jets;
   (b) thrust augmentation means operatively associated with said exhaust tubes for selectively injecting and burning fuel within said exhaust tubes to provide thrust augmentation; and (c) actuator means for selectively moving said exhaust tubes between the first position and the second position.

6. The apparatus as claimed in claim 5 wherein certain of said exhaust tubes are outer peripheral tubes and others are inner tubes, and wherein said actuator means comprises:
  (a) power operable means connected to said outer peripheral tubes for moving said tubes between the first position and the second position; and
  (b) linkage means connected between said outer peripheral tubes and the next adjacent radially successive inner tubes for moving said inner tubes between the first position and the second position in response to the corresponding movement of said outer peripheral tubes.

7. The apparatus as claimed in claim 5 wherein said thrust augmentation means comprises:
  (a) conduit means terminating in a nozzle end within at least certain of said exhaust tubes and adapted to introduce fuel into the exhaust gas stream; and
  (b) flame holder means positioned in the exhaust gas stream within said certain exhaust tubes for generating a region of reduced exhaust gas flow velocity downstream of the nozzle end of said conduit means for stabilizing combustion of the introduced fuel.

8. The apparatus as claimed in claim 7 further including exhaust tube cooling means positioned interiorly of said exhaust tubes extending downstream of said flame holder means for diverting a portion of the exhaust gas flow around the region of reduced exhaust gas flow velocity to cool the interior wall surface of said exhaust tubes.

9. The combination as claimed in claim 8 wherein said exhaust tube cooling means comprises a perforated cylindrical sleeve coaxially positioned within said exhaust tubes and spaced apart from the interior wall surface thereof forming an annular chamber between said sleeve and the interior wall surface of said exhaust tubes for the flow of said portion of the exhaust gas therethrough.

10. An apparatus for jet engine exhaust noise suppression and thrust augmentation comprising:
  (a) tubular longitudinally extending nacelle means connected to the jet engine and having an outer peripheral wall terminating in a downstream exit plane;
  (b) means defining a plurality of circumferentially spaced apertures in the peripheral wall of said nacelle means;
  (c) operable door means for selectively opening and closing the apertures in said nacelle means;
  (d) a plurality of exhaust tubes contained within said nacelle means and grouped about a central longitudinal axis; said tubes having an upstream end for receiving the jet engine exhaust gas and a downstream end, terminating upstream of the nacelle exit plane, for discharge of said gas; said tubes further being movable between a first position, wherein the downstream ends of said tubes are close packed in adjacent relationship for discharge of the jet engine exhaust gas in a substantially single composite jet within said nacelle means, and a second position, wherein the downstream ends of said exhaust tubes are radially deployed in a spaced apart relationship with the downstream ends of at least certain of said exhaust tubes adjacent the apertures in said nacelle means for the discharge of the jet engine exhaust gas in substantially separate jets through the apertures in said nacelle means when said apertures are open;
  (e) thrust augmentation mean operatively associated with said exhaust tubes for selectively injecting and burning fuel within said exhaust tubes to provide thrust augmentation; and
  (f) actuator means for selectively closing and opening the apertures in said nacelle means and for moving said exhaust tubes between the first position and the second position.

11. The apparatus as claimed in claim 10 wherein said actuator means comprises:
  (a) power operable means connected to said door means for closing and opening the apertures in said nacelle means; and
  (b) linkage means connected between said door means and said exhaust tubes for moving said exhaust tubes to the first position when the apertures are closed and for moving said exhaust tubes to the second position when the apertures are opened.

12. The apparatus as claimed in claim 10 wherein said thrust augmentation means comprises:
  (a) conduit means terminating in a nozzle end within at least certain of said exhaust tubes and adapted to introduce fuel into the exhaust gas stream; and
  (b) flame holder means positioned in the exhaust gas stream within said certain exhaust tubes for generating a region of reduced exhaust gas flow velocity downstream of the nozzle end of said conduit means for stabilizing combustion of the introduced fuel.

13. The apparatus as claimed in claim 12 further including a perforated cylindrical sleeve coaxially positioned within said exhaust tubes extending downstream of said flame holder means and spaced apart from the interior wall surface of said exhaust tubes, said sleeve cooperating with the interior wall surface of said tubes to form an annular chamber for the flow of a portion of the exhaust gas therethrough to cool the interior wall surface of said exhaust tubes.

14. An apparatus for jet engine exhaust noise suppression and thrust augmentation comprising:
  (a) tubular longitudinally extending nacelle means connected to the jet engine and having an outer peripheral wall terminating in a downstream exit plane;
  (b) means defining a plurality of circumferentially spaced apertures in the peripheral wall of said nacelle means;
  (c) a plurality of longitudinally extending exhaust tubes contained within said nacelle means and grouped about a central longitudinal axis, certain of said exhaust tubes being outer peripheral tubes and others being inner tubes; said exhaust tubes further including fixed upstream portions for receiving jet engine exhaust gas and movable downstream portions terminating in downstream ends upstream of the exit plane of said nacelle means; said downstream portions communicating with said upstream portions and movable between a first position, wherein the downstream ends are close packed in adjacent relationship for discharge of the jet engine exhaust gas in a substantially single composite jet within said nacelle means, and a second position, wherein the downstream ends are radially deployed in a spaced apart relationship with the downstream ends of the outer peripheral tubes adjacent the apertures in said nacelle means for the discharge of the jet engine exhaust gas in substantially separate jets through the apertures in said nacelle means;
  (d) thrust augmentation means operatively associated with said exhaust tubes for selectively injecting and burning fuel within said exhaust tubes to generate thrust augmentation;
  (e) door means pivotally attached to said nacelle means and movable between a closed position and an open position to close and open the apertures in said nacelle means; and
  (f) actuator means for moving said door means between the closed position and the open position, and for simultaneously moving the downstream portions of said exhaust tubes between the first position and the second position.

15. The apparatus as claimed in claim 14 wherein said actuator means comprises:
  (a) power operable means connected to said door means for moving the door between the closed position and the open position;

(b) first linkage means connected between said door means and the downstream portions of said outer peripheral exhaust tubes; and (c) second linkage means connected between each of the downstream portions of said outer peripheral exhaust tubes and the downstream portions of the next adjacent radially successive inner tubes; whereby the first linkage means moves the downstream portions of the outer peripheral tubes between the first position and the second position as the door means is moved between the closed position and the open position, respectively, and the second linkage correspondingly moves the downstream portions of the inner tubes between the first position and the second position.

16. The apparatus as claimed in claim 14 wherein said thrust augmentation means comprises:

(a) conduit means terminating in a spray nozzle end within each of said exhaust tubes and adapted to introduce fuel into exhaust gas stream;

(b) flame holder means positioned in the exhaust gas stream in each of said exhaust tubes for creating a region of reduced exhaust gas flow velocity downstream of the nozzle end of said conduit means for stabilizing combustion of the introduced fuel; and (c) a perforated cylindrical sleeve coaxially positioned within said exhaust tubes extending downstream of said flame holder means and spaced apart from the interior wall surface of said exhaust tubes, said sleeve cooperating with the interior wall surface of said tubes to form an annular chamber for the flow of a portion of the exhaust gas therethrough to cool the interior wall surface of said exhaust tubes.

References Cited

UNITED STATES PATENTS

| 2,482,505 | 9/1949 | Pierce | 60—263 |
| 2,760,339 | 8/1956 | Jurisich | 60—39.72 P |
| 2,782,593 | 2/1957 | Lee | 60—263 |
| 2,944,399 | 7/1960 | McCardle | 60—39.72 |

DOUGLAS HART, Primary Examiner

U.S. Cl. X.R.

60—39.72 R, 263; 181—33 HB; 239—265.27